US007711264B1

(12) United States Patent
Eslambolchi et al.

(10) Patent No.: US 7,711,264 B1
(45) Date of Patent: May 4, 2010

(54) LOCAL AREA WARNING OF OPTICAL FIBER INTRUSION

(75) Inventors: Hossein Eslambolchi, Los Altos Hills, CA (US); John Sinclair Huffman, Conyers, GA (US)

(73) Assignee: AT&T Intellectual Property II, L.P., Reno, NV (US)

( * ) Notice: Subject to any disclaimer, the term of this patent is extended or adjusted under 35 U.S.C. 154(b) by 0 days.

(21) Appl. No.: 11/904,497

(22) Filed: Sep. 27, 2007

Related U.S. Application Data

(62) Division of application No. 11/007,042, filed on Dec. 8, 2004, now abandoned.

(51) Int. Cl.
*H04B 10/08* (2006.01)
*G02B 6/00* (2006.01)

(52) U.S. Cl. .............................. 398/9; 398/10; 385/12; 385/13

(58) Field of Classification Search .............. 398/9-10; 385/12-13
See application file for complete search history.

(56) References Cited

U.S. PATENT DOCUMENTS

| | | | | |
|---|---|---|---|---|
| 4,630,035 | A * | 12/1986 | Stahl et al. | 340/539.13 |
| 6,148,123 | A * | 11/2000 | Eslambolchi et al. | 385/13 |
| 6,332,738 | B1 * | 12/2001 | Eslambolchi et al. | 405/175 |
| 2003/0094298 | A1 * | 5/2003 | Morrow et al. | 174/48 |

* cited by examiner

*Primary Examiner*—Quan-Zhen Wang

(57) ABSTRACT

Disclosed is a method and apparatus which provides for alerting of potential fiber optic cable intrusion. A stress detector located at a fiber optic cable termination point detects stress on the fiber optic cable and generates an alarm signal in response to the stress detection. The alarm signal is transmitted to remote alarm units along the fiber optic right of way via a conductive metallic portion of the fiber optic cable (e.g., the fiber optic cable sheath). In response to receipt of an alarm signal, the alarm units initiate a perceptible (e.g., audible and/or visible) alarm. The stress detector may also determine a location of the stress, and generate an alarm signal addressed to a particular one or more alarm units in the vicinity of the stress location.

11 Claims, 2 Drawing Sheets

LOCAL AREA WARNING OF OPTICAL FIBER INTRUSION

This application is a divisional of prior application Ser. No. 11/007,042 filed Dec. 8, 2004 now abandoned which is incorporated herein by reference.

BACKGROUND OF THE INVENTION

The present invention relates generally to optical fiber intrusion systems, and more particularly to providing local area warning of optical fiber intrusion.

Recent years have seen a proliferation of telecommunication services. With the additional services has come an increased need for network infrastructure, including in particular, buried cables and associated equipment. One type of cable is fiber optic cable, which generally contains multiple optical fibers bundled together within one cable.

Fiber optic cable is subject to damage, especially when buried close to the surface or when located in the vicinity of a construction site. Since a single fiber optic cable may carry a very large amount of data, the failure of a single fiber optic cable may result in service outage for a large number of customers. As such, network service providers take precautions in order to avoid such failure.

One technique for monitoring buried fiber optic cable is disclosed in U.S. Pat. No. 5,778,114, entitled Fiber Analysis Method and Apparatus. That patent describes a fiber intrusion detection system for detecting an intrusion or potential intrusion to a buried fiber optic cable. That system includes an optical splitter for splitting an optical signal into sub-signals for injection into opposite ends of a looped optical fiber. The signals emanating from the opposite fiber ends are recombined at the splitter for receipt at a detector that measures the phase difference between the optical sub-signals. A processor compares the phase difference measured by the detector to known phase difference measurements associated with different types of threats. By matching the actual phase difference to the known phase difference measurement associated with a particular type of intrusion, the processor can thus identify the nature of the intrusion.

While detecting the fiber intrusion threat is important, in order to avoid actual damage to a fiber optic cable, it is also important to warn the potential intruder of the imminent threat. However, an alarm at a central network location may not allow for network provider personnel to reach the actual threat location (e.g., construction site) in time to avoid the damage. In recognition of this problem, the '114 patent discloses a disturbance monitor that may be dispersed along the right-of-way of the fiber optic cable for providing a visible and/or audible warning in the field in response to a signal from the fiber intrusion detection system. The '114 patent discloses a wireless link between the fiber intrusion detection system and the disturbance monitor for signaling an alarm condition. One disadvantage of that configuration is that a wireless communication link may not always be available, or such a link may provide an unreliable communication channel.

BRIEF SUMMARY OF THE INVENTION

The present invention provides an improved technique for alerting of potential fiber optic cable intrusion. In accordance with the invention, an alarm signal is generated in response to detection of a stress on a fiber optic cable. The detection may be performed by a stress detector located at a fiber optic cable termination point. The alarm signal is then transmitted to remote alarm units along the fiber optic cable right of way via a conductive metallic portion of the fiber optic cable. The use of the fiber optic cable itself to transmit the alarm signal is an improvement over the prior techniques which generally utilized an unreliable wireless communication channel. In one embodiment of the invention, the alarm signal is transmitted via the metallic sheath of the fiber optic cable.

In addition to detecting stress, the stress detector may also determine the location of the stress, thereby determining the location of a potential threat to the fiber optic cable. Various techniques for detecting the location of the stress are disclosed herein. The system uses the location of the stress in order to determine one or more remote alarm units which are associated with the location in order to activate an alarm at those alarm units. Such alarm may be, for example, an audible or visible alarm in the vicinity of the stress which will notify people that there is potential danger to the fiber optic cable. The one or more remote alarm units may therefore be separately addressed such that the stress detection mechanism may determine which individual alarm units to be activated. There are various techniques for addressing the individual alarm units, such as sending the alarm signals on particular frequencies, embedding unique identifiers in the alarm signal, or utilizing particular signal pulse patterns in the alarm signal. Alternatively, instead of activating particular ones of the alarm units, a global alarm may be used, to which all alarm units are responsive, in order to active all the alarm units along the fiber optic cable right of way.

Upon receipt of an alarm signal to which an alarm unit is responsive, the alarm unit will activate a perceptible alarm (e.g., audible or visible). In one embodiment, the alarm signal may indicate the type or duration of the alarm to be activated. In addition, the alarm unit may contain user input/output components to allow for configurability of the unit by a user.

These and other advantages of the invention will be apparent to those of ordinary skill in the art by reference to the following detailed description and the accompanying drawings.

DETAILED DESCRIPTION

Figure 1:
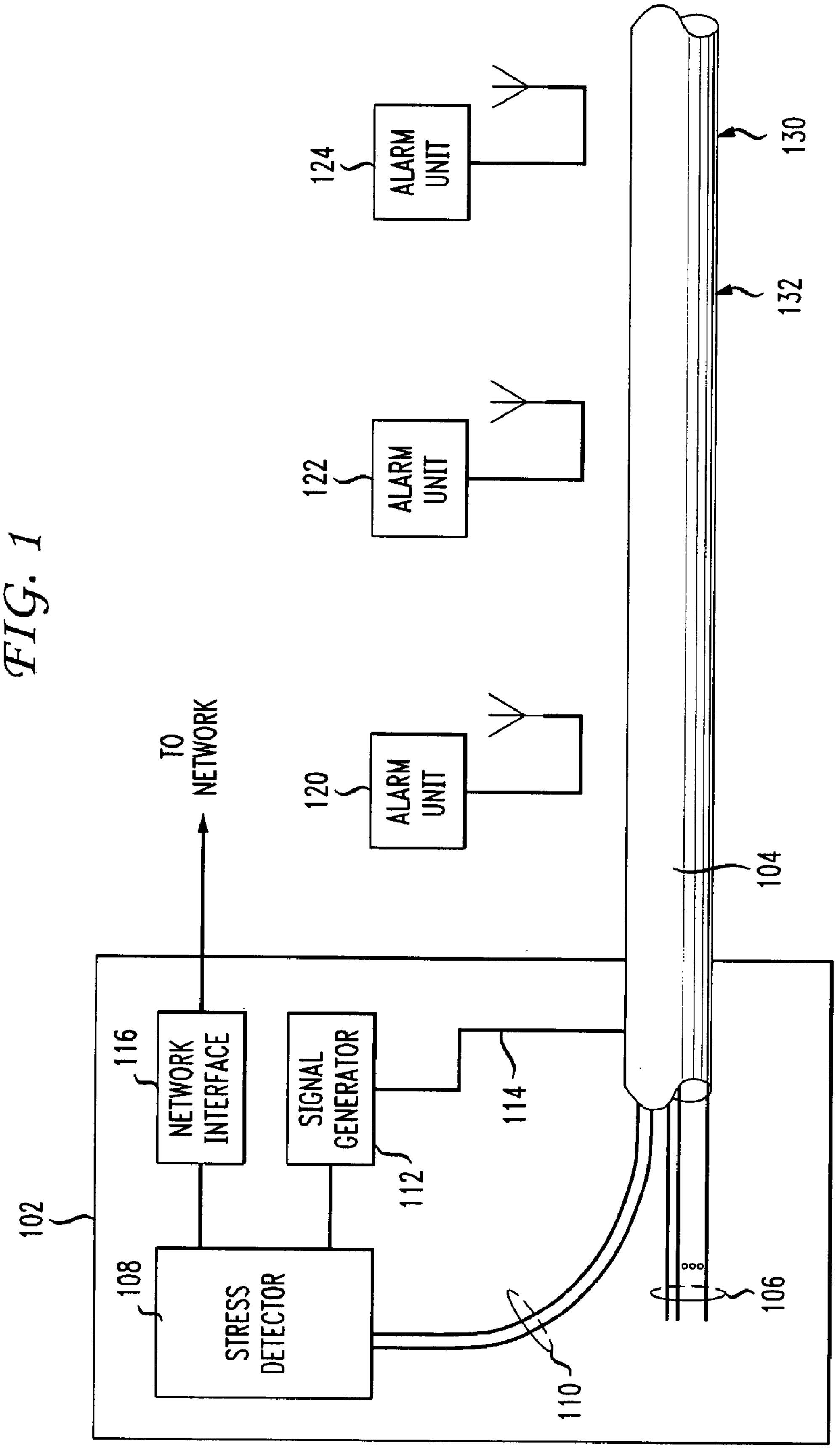
FIG. 1 shows a system designed in accordance with one embodiment of the invention.

FIG. 1 shows a system designed in accordance with one embodiment of the invention. FIG. 1 shows a fiber termination point 102 which terminates one end of a fiber optic cable 104. As is well known, fiber optic cable 104 contains multiple optical fibers as shown in FIG. 1. Optical fibers 106 are used for data communication and would be connected to well known equipment in order to implement data communication in a manner will known in the art. For clarity, such well known data communication equipment is not shown in FIG. 1. Optical fiber 110 is a looped optical fiber whose endpoints are connected to a stress detector 108. Stress detector 108 is used to recognize stress on fiber optic cable 104.

Figure 2:
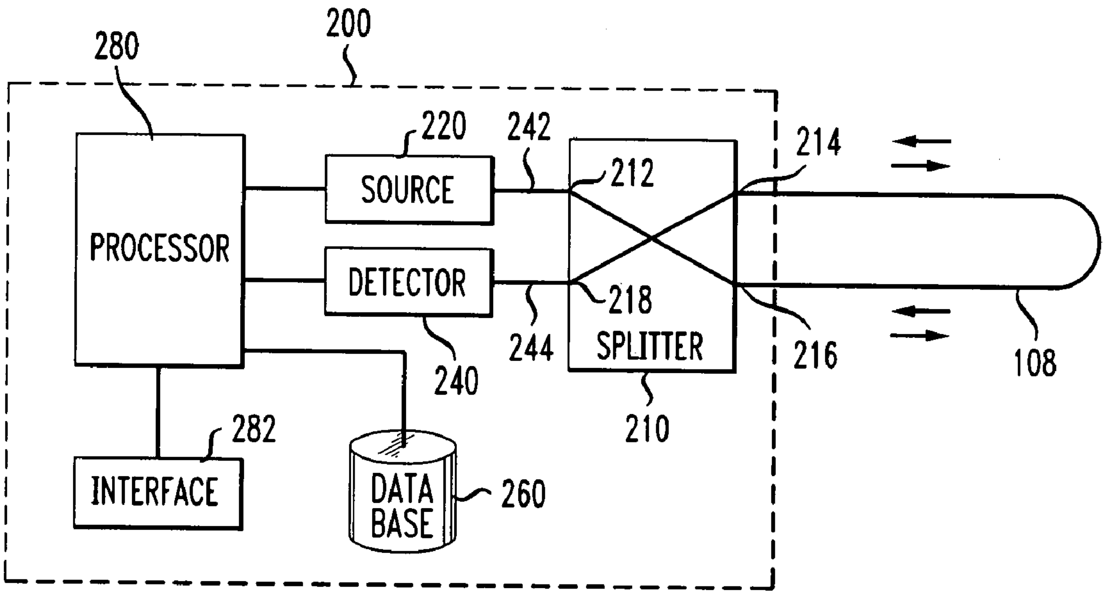
FIG. 2 shows one embodiment of a stress detector which may be used in accordance with the present invention.

In one embodiment, the stress detector may be of the type described in U.S. Pat. No. 5,778,114, entitled Fiber Analysis Method and Apparatus, which is incorporated herein by reference. Such a stress detector (referred to in the '114 patent as Fiber Analysis System (FAS)) is shown in FIG. 2 as stress detector 200. The stress detector 200 includes a splitter 210 having four ports 212, 214, 216, 218. A source of light 220 having a high degree of coherence, such as a laser, produces a relatively narrow beam of light 242 for receipt at the splitter port 212. Upon receipt of the beam 242 at its port 212, the splitter 210 splits the beam, yielding two optical sub-signals at the splitter ports 214 and 216. The sub-signals are injected into to opposite ends of the fiber 108 and traverse the fiber in opposite directions. Each optical sub-signal exits the fiber 108 from the end opposite the end into which the sub-signal was injected.

The optical sub-signals exiting the fiber 108 ends re-enter the splitter ports 214 and 216, respectively, for re-combination by the splitter 210 into a single beam 244 that exits the splitter port 218 for receipt at a detector 240. The detector 240 detects characteristics of the beam, and particularly, the interference between the two optical sub-signals recombined at the splitter 210. If the two optical sub-signals destructively interfere, then power of the beam detected by the detector 240 is low, whereas if the optical sub-signals constructively interfere, the power produced by the beam is high.

Under quiescent conditions, that is, with no stresses on the fiber 108, the optical sub-signals traveling in opposite directions in the fiber are 180 degrees out-of-phase and cancel each other. However, when the fiber is stressed because of vibration, the sub-signals are not completely out of phase and do not cancel each other. Thus, the output signal of the detector 240 will change in response to stress on the fiber. Varying the split provided by the splitter 210 may control the magnitude of the detected phase difference. A 50-50 split provides the greatest sensitivity. However, other percentages may be desired where noise is a factor.

As taught in the aforementioned '114 patent, the particular stresses on the fiber are characterized by a processor 280 in the form of a computer or the like which controls the light source 220 to generate a continuous beam, a random pattern of light, or a pulsed beam representative of a string of binary values representing a digital word. The processor 280 is responsive to the output signal of the detector 240 and serves to compare the re-combined beam characteristics detected by the detector to plurality of reference values stored in a data base 260, typically comprised of a magnetic storage medium, such as a disk drive. For purposes of illustration, the database 260 has been depicted in FIG. 2 as an element distinct from the processor 280. In reality, the database 260 may reside on a disk drive within the processor itself. Alternatively, the data base 28 could reside on a file server (not shown) connected to the processor.

The processor 280 communicates through an interface 282 which allows the stress detector 200 to communicate with external devices and networks as will be described in further detail below. Although a single interface 282 is shown, interface 282 is meant to represent one or more interfaces through which stress detector 200 communicates with other devices.

In an alternate embodiment, the stress detector 108 may be configured and operated as described in U.S. Pat. No. 5,194,847, entitled Apparatus and Method for Fiber Optic Intrusion Sensing, which is incorporated herein by reference. The '847 patent describes an apparatus for sensing intrusion into a predefined perimeter using a coherent pulsed light. The apparatus includes a coherent light pulse source for injecting coherent light pulses into an optical fiber having a predetermined length and positioned along a predefined perimeter. Light is backscattered from the optical fiber due to Rayleigh backscattering and coupled into an optical receiving fiber. The backscattered light is detected by a photodetector coupled to the optical fiber and a signal is produced in response thereto. An intrusion is detectable as a change in the produced signal. To increase the sensitivity of the apparatus, a reference fiber and an interferometer may also be employed. In an embodiment in which the stress detector 108 is configured in accordance with the teachings of the '847 patent, optical fiber 110 would be a single, non-looped, optical fiber.

Thus, returning to FIG. 1, by using the above described techniques, the stress detector 108 can determine whether fiber optic cable 104 is subject to stress and the threat of intrusion. Considering that the fiber optic cable 104 may be approximately 30 miles long (at which point it connects to another fiber termination point (not shown) for signal regeneration or other signal processing) it is advantageous to determine not only that the fiber optic cable 104 is subject to stress, but the location of such stress along the length of fiber optic cable 104. There are various known techniques for determining the stress location along the length of a fiber optic cable which may be used in accordance with the present invention.

In the embodiments described above, Optical Time Domain Reflectometry (OTDR) may be used in order to determine the location of the intrusion along an optical fiber. In accordance with OTDR, an optical signal is injected into one end of an optical fiber for propagation along the fiber. The signal injected into the fiber will reflect back from a stress point. By measuring the time difference between the transmission of the forward signal and the receipt of the reflected signal, the distance to the stress point can be determined. In an embodiment in which the stress detector 108 is configured in accordance with the teachings of the '114 patent, one skilled in the art could readily incorporate well known OTDR techniques in order to add a stress point location determination. In an embodiment in which the stress detector 108 is configured in accordance with the teachings of the '847 patent, it should be recognized that OTDR and stress point location is incorporated into the teachings of that patent.

Returning now to FIG. 1, upon a determination that a threat to the fiber optic cable 104 exists, an alarm is to be initiated at the location of the threat. In accordance with an embodiment of the invention, one or more alarm units are placed in the field at known locations. FIG. 1 shows three alarm units, 120, 122, 124 at known locations along the fiber optic cable 104 right of way. In one embodiment, each alarm unit may be associated with an area, or zone, rather than a particular location.

In accordance with the invention, and to overcome the deficiencies of prior approaches, the stress detector communicates an alarm signal to an alarm unit via the metallic sheath (or other metallic portion) of the fiber optic cable 104. This eliminates the potential problems of communicating via a wireless communication link, such as the link not always being available, or the link providing an unreliable communication channel.

In operation, stress detector 108 will detect a stress on fiber optic cable 104 and will determine the location of such stress as described above. Upon such determination, the stress detector 108 will determine which of the alarm units should activate an alarm (e.g., those alarm units that are located in the vicinity of the stress or potential threat). Stress detector 108 may make this determination based on information stored in processor 280, database 260, or some other memory or storage device. Such information will associate particular alarm units with particular fiber optic cable locations or zones. For example, if the stress is determined to be located at point 130 on fiber optic cable 104, stress detector 108 may determine that alarm unit 124 is to be activated. It is also noted that multiple alarm units may be activated in response to a stress detection by stress detector 108. For example, if the stress is determined to be located at point 132 on fiber optic cable 104, stress detector 108 may determine that both alarm units 122 and 124 are to be activated. Of course, various options are possible for determining which one or more alarm units are to be activated upon a stress determination.

Upon a determination of which alarm unit(s) to activate, the stress detector will initiate an appropriate signal to active the alarm unit(s). As described above, the signaling of alarm units to initiate activation is accomplished by sending an alarm signal to the alarm unit(s) via the conductive metallic sheath of the fiber optic cable 104. The application of a signal to the metallic sheath of a fiber optic cable is currently known for use in locating buried cable. The applied signal is generally an alternating current (AC) signal. The location signal is propagated via the metallic sheath and a resultant magnetic field is radiated along the length of the fiber optic cable. The radiated magnetic field is detectable by surface equipment. As shown in FIG. 1, in accordance with one embodiment of the invention the stress detector 108 activates signal generator 112. Signal generator 112 applies an appropriate AC signal to the metallic sheath of fiber optic cable 104 via connection 114.

In accordance with the present invention, the alarm units may be individually addressed so that the stress detector may control which of the alarm units activates its alarm. There are various possible techniques for addressing individual alarm units. For example, each of the alarm units, or each of the alarm units within a particular zone, may be associated with, and responsive to, a particular frequency. In this embodiment, the stress detector will determine the alarm units to be activated and send appropriate instructions to signal generator 112 in order to initiate an alarm signal at the appropriate frequency. Another technique for addressing individual alarm units is to associate each of the alarm units, or each of the alarm units within a particular zone, with a unique identifier. In this embodiment, the stress detector will determine the alarm units to be activated and send appropriate instructions to signal generator 112 in order to initiate an alarm signal having embedded therein the unique identifier of the alarm units to be activated. Yet another technique for addressing individual alarm units is to configure the alarm units to be responsive to a particular signal pulse pattern. One skilled in the art will recognize that there are various alternate techniques for addressing individual alarm units.

In certain situations it may be advantageous to activate all alarm units associated with a fiber optic cable (i.e., a global alarm), regardless of their associated location or zone. As such, each alarm unit may also be responsive to a particular global alarm signal (e.g., a particular frequency, identifier or signal pulse pattern), which may be used to active all of the alarm units along the fiber optic cable 104 right of way.

Figure 3:
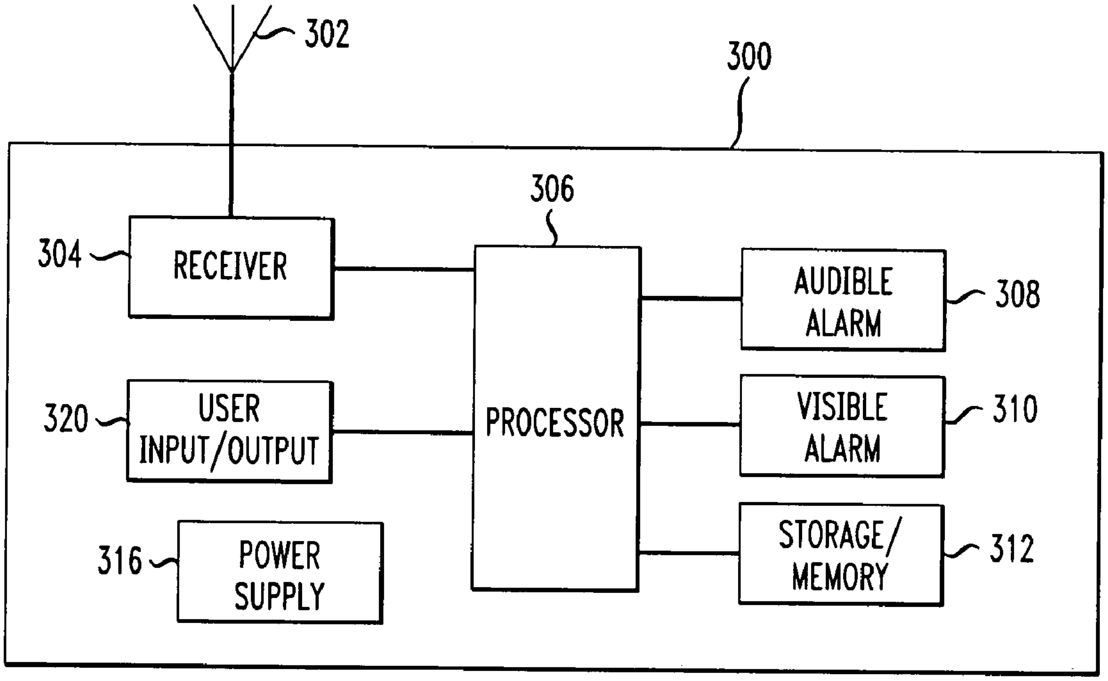
FIG. 3 is a block diagram of one embodiment of an alarm unit which may be used in accordance with the present invention.

Further details of the configuration of an alarm unit are shown in FIG. 3. It is to be understood that FIG. 3 is a high level block diagram of an alarm unit used to describe the configuration and functionality of an alarm unit in accordance with the present invention. One skilled in the art would be able to implement an alarm unit given this description. The overall operation of alarm unit 300 is controlled by a processor 306 which operates to control the alarm unit 300 by executing stored computer program code which defines the desired operation. The stored computer program code is stored in a storage/memory unit 312 which may be implemented using any type of computer readable medium, including magnetic, electrical, optical, or other type of media. Although storage/memory unit 312 is shown in FIG. 3 as a single unit, it may also be comprised of multiple units. Alternatively, the operation of alarm unit 300 may be defined by the circuit or hardware configuration of processor 306, or by any combination of hardware and software. Alarm unit 300 also contains an antenna 302 for receiving the signals radiated from the fiber optic cable 104 as described above. Antenna 302 is connected to receiver 304 which processes the received signals and provides them to processor 306. Alarm unit 300 also contains one or more audible alarm components 308 for providing an audible alarm in the vicinity of the alarm unit. An audible alarm component may be, for example, a loudspeaker or siren. Alarm unit 300 also contains one or more visible alarm components 310 for providing a visible alarm in the vicinity of the alarm unit. A visible alarm component may be, for example, a high intensity strobe light. The alarm unit 300 also contains a power supply 316 for supplying power to the unit. In one embodiment, the power supply may be a self contained battery to allow for use in the field. The alarm unit 300 also contains user input/output devices 320 (e.g., keyboard, mouse, buttons, indicator lights, display screen, etc.) to allow a user to interface with the alarm unit. For example, this user interface may be used to allow a technician to program into storage/memory 312 the appropriate one or more frequencies, identifiers or signal pulse patterns to which the alarm unit 300 will be responsive.

The alarm unit 300 will be located in the vicinity of a fiber optic cable so that the antenna 302 may receive alarm signals radiated from the fiber optic cable as described above. The alarm unit 300 may be placed above the ground so that the audible and visible alarms may be detected by people in the vicinity of the alarm unit. The antenna may also be above the ground as the alarm signals radiated from the fiber optic cable will be detectable by the above ground antenna. Alternatively, it is possible to place certain portions of the alarm unit (e.g., antenna) below ground, while leaving the audible and visible alarms above ground. Since the alarm unit 300 may be outside and exposed to the elements for prolonged periods, it is advantageously designed to withstand harsh weather conditions as well as repeated installation and removal. It is also advantageously tamper and vandal resistant. The alarm unit 300 may be mounted on top of cable marker posts, or secured to other structures. In one embodiment, the alarm unit may be affixed to objects by a chain which enters the unit via a marker post entry hole, and locks into slots (or over a peg) within the housing. The chain will be held in place by a closed door on the alarm unit enclosure. The area containing the chain will be separated from any battery, electronics, and antenna.

In operation, the alarm unit 300 will receive via antenna 302 signals radiated from the fiber optic cable. A received signal will be processed by receiver 304 and passed to processor 306. Processor 306 will determine whether the received signal is one which should activate the particular alarm unit 300. The processing of signals will depend upon the particular implementation. In one embodiment, in which the alarm units are responsive to alarm signals on particular frequencies, the processor 306 may configure receiver 304 to only receive signals on the particular frequency associated with the particular alarm unit. Alternatively, in the embodiment in which the alarm units are responsive to certain identifiers within the alarm signals, then upon receipt of an alarm signal the processor will compare the identifier embedded in the alarm signal with the identifier(s) to which the alarm unit is responsive (such identifier(s) may be stored in storage/memory 312). Alternatively, in the embodiment in which the alarm units are responsive to certain pulse patterns within the alarm signals, then upon receipt of an alarm signal the processor will compare the received pulse pattern in the alarm signal with the pulse pattern(s) to which the alarm unit is responsive (such pulse pattern(s) may be stored in storage/memory 312).

In yet other embodiments, it may be possible that signals other than alarm signals (e.g., location or otherwise) may be propagated by the metallic sheath of the fiber optic cable and therefore received by the alarm unit 300 antenna 302. In such embodiments, a preliminary test for any signal received by alarm unit 300 may be whether or not the particular signal is an alarm signal or some other type of signal.

In addition to alerting the alarm unit 300, an alarm signal may also contain additional configuration information for the alarm unit 300. For example, the alarm signal may contain information which specifies the type (e.g., audible and/or visible) of alarm which the alarm unit 300 is to initiate. The alarm signal may also contain information which specifies the duration of the alarm. With respect to alarm duration, it is also noted that a user in the field may terminate the alarm by pressing an appropriate button (user input 320) on the unit.

Returning to FIG. 1, fiber termination point 102 may also contain a network interface 116 connected to stress detector 108. Upon detection of a stress (and its location) on fiber optic cable 104, the stress detector 108 may send an alarm notification to another entity via a network. For example, upon detection of a stress, stress detector 108 may send an alarm notification to a device (e.g., pager or telephone) associated with a technician or to a central monitoring station. These alarm notifications may be sent via network interface 116 and the public switched telephone network (PSTN), a data network (e.g., Internet), or any other appropriate network.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention. For example, while the above described embodiments describe the use of the metallic sheath of the fiber optic cable for transmitting the alarm signal, any conductive metallic portion of a fiber optic cable could be used to transmit the alarm signal. For example, an additional wire could be added within the fiber optic cable sheath for such purposes.

We claim:

1. A method for alerting of potential fiber optic cable intrusion, said fiber optic cable comprising a plurality of optical fibers and a conductive metallic portion, said method comprising the steps of:

detecting a stress on said fiber optic cable;

determining a location of said stress;

identifying at least one alarm unit associated with said location from a plurality of alarm units, wherein each alarm unit is associated with at least one of a plurality of locations;

generating an alarm signal indicating potential fiber optic intrusion in response to said stress detection, said alarm signal comprising configuration information; and transmitting said alarm signal to said at least one alarm unit via said conductive metallic portion of said fiber optic cable.

2. The method of claim 1 wherein said conductive metallic portion is a metallic sheath.

3. The method of claim 1 wherein said step of detecting a stress on said fiber optic cable comprises detecting a stress on at least one of said plurality of optical fibers.

4. The method of claim 3 wherein said step of detecting a stress comprises the steps of:

splitting an optical signal into a pair of sub-signals;

injecting each sub-signal into an end of said at least one of said plurality of optical fibers so that the sub-signals traverse the fiber in opposite directions to emanate from ends into which each sub-signal was injected; and combining the sub-signals emanating from the fiber ends into a single recombined beam; and measuring the characteristics of the recombined beam.

5. The method of claim 1 further comprising the step of:

transmitting said alarm signal as a global alarm signal to all of a plurality of alarm units associated with said fiber optic cable.

6. The method of claim 1 wherein said alarm signal is transmitted via a frequency associated with said identified at least one alarm unit.

7. The method of claim 1 wherein said alarm signal contains indicia associated with said identified at least one alarm unit.

8. The method of claim 1 further comprising the step of:

transmitting an alarm notification signal to a device associated with a technician.

9. The method of claim 1 further comprising the step of:

transmitting an alarm notification signal to a central monitoring station.

10. The method of claim 1 wherein said configuration information specifies a type of alarm said at least one alarm unit is to initiate.

11. The method of claim 1 wherein said configuration information specifies a duration of alarm said at least one alarm unit is to initiate.

* * * * *